United States Patent
Andersen et al.

(10) Patent No.: US 6,829,364 B2
(45) Date of Patent: Dec. 7, 2004

(54) HEARING AID WITH A CAPACITOR HAVING A LARGE CAPACITANCE

(75) Inventors: Henning Haugaard Andersen, Birkerod (DK); Ole Erik Toft, Brondby (DK)

(73) Assignee: Topholm & Westermann APS, NY, Vaerloese (DK)

( * ) Notice: Subject to any disclaimer, the term of this patent is extended or adjusted under 35 U.S.C. 154(b) by 0 days.

(21) Appl. No.: 09/886,284

(22) Filed: Jun. 22, 2001

(65) Prior Publication Data

US 2002/0196956 A1 Dec. 26, 2002

(51) Int. Cl.[7] .............................................. H04R 25/00
(52) U.S. Cl. ..................................................... 381/323
(58) Field of Search ................................. 381/312, 314, 381/323, 316, 317, 320, 321, 322, 328

(56) References Cited

U.S. PATENT DOCUMENTS

| | | | |
|---|---|---|---|
| 4,689,819 A | * 8/1987 | Killion | 381/312 |
| 4,887,299 A | * 12/1989 | Cummins et al. | 381/312 |
| 4,995,085 A | * 2/1991 | Kern et al. | 381/314 |
| 5,130,571 A | * 7/1992 | Carroll | 381/315 |
| 5,321,758 A | * 6/1994 | Charpentier et al. | 381/314 |
| 5,402,494 A | * 3/1995 | Flippe et al. | 381/315 |
| 5,483,600 A | * 1/1996 | Werbach | 381/316 |
| 5,531,787 A | 7/1996 | Lesinski et al. | |
| 5,712,919 A | 1/1998 | Ruhling | |
| 5,881,158 A | 3/1999 | Lesinski et al. | |
| 6,304,467 B1 | * 10/2001 | Nebrigic | 363/49 |
| 6,369,551 B1 | * 4/2002 | Blumenkrantz et al. | 323/244 |
| 6,370,046 B1 | * 4/2002 | Nebrigic | 363/59 |
| 2002/0019446 A1 | 2/2002 | Brocchini et al. | |

FOREIGN PATENT DOCUMENTS

| | | |
|---|---|---|
| DE | 197 12 236 C1 | 10/1998 |
| DE | 198 09 567 A1 | 9/1999 |
| DE | 198 54 201 A1 | 6/2000 |

OTHER PUBLICATIONS

Harry Neutebom et al, "A DSP-based hearing Instrument IC", IEEE Journal of Solid-State Circuits, vol. 32, No. 11, Nov. 1997, pp. 1790-1806.

* cited by examiner

*Primary Examiner*—Rexford Barnie
(74) *Attorney, Agent, or Firm*—Sughrue Mion, PLLC

(57) ABSTRACT

A hearing aid is provided having a capacitor with a large capacitance coupled in parallel with the energy source for transient current supply. The operating period of the battery is prolonged compared to prior art digital hearing aids. Further, the smaller variations in supply voltage lead to less distortion of the output signal of the hearing aid signal processor. In a hearing aid with a telecoil, a well defined current path for the current transients generating the high magnetic fields picked up by the telecoil is established. This facilitates the design of a compensating current path that is substantially independent of battery type and position.

12 Claims, 8 Drawing Sheets

HEARING AID WITH A CAPACITOR HAVING A LARGE CAPACITANCE

FIELD OF THE INVENTION

The present invention relates to a hearing aid that is partly powered by a capacitor having a large capacitance.

BACKGROUND OF THE INVENTION

Most hearing aids are powered by a replaceable battery. Metal-air cells, such as zinc-air cells, are commonly used to power hearing aids because of their stable output voltage during their operating period. Metal-air cells use air to activate the cell. They are activated when air, in particular oxygen, is allowed to enter the cell. Prior to use, the battery is sealed with a pull-tab that covers one or more small openings that allow air to reach an air-cathode assembly within the cell. To activate the battery, the pull-tab is removed and air is allowed into the battery. The battery is then inserted into the hearing aid. The open-circuit voltage of a fresh zinc-air cell is typically 1.4 Volt. During use, the output voltage of the battery decreases slowly with time until the end of the battery life where the output voltage drops more rapidly. The life or operating period of the battery is the period within which the battery output voltage is greater than the minimum operating voltage of the circuit, the battery supplies. It is measured in ampere hours. In an analog hearing aid, the minimum operating voltage is typically 0.9 Volt.

Prior art hearing aids may have a battery alarm circuit that alerts the use when the output voltage of the battery falls below a certain threshold voltage. Thus, the threshold in an analog hearing aid is typically 0.9 Volt.

The emergence of hearing aids with digital circuitry, e.g. digital signal processors, has increased the demands on batteries used to power hearing aids. For example, the digital circuitry does not operate at a supply voltage below 1.1 Volt. Also the current needed to supply the digital circuitry increases rapidly as a function of increasing output volume of the hearing aid, and transient currents drawn by the digital circuitry tend to be larger and of shorter rise and fall times than transient currents drawn by analog circuitry. This means that users of digital hearing aids experience a shortened battery life and in some cases even an extremely shortened battery life.

SUMMARY OF THE INVENTION

It is an object of the present invention to provide a hearing aid having an electronic circuit drawing low transient currents with slow rise and fall times so that a battery powering the hearing aid exhibits a long life, i.e. operating period.

According to the present invention, a hearing aid is provided having a housing holding an input transducer for transforming an acoustic input signal into a first electrical signal, a signal processor means for compensating a hearing deficiency by generation of a second electrical signal based on the first electrical signal, an output transducer for conversion of the second signal into sound, an energy source for supplying energy to at least the signal processor, and at least one capacitor with a large capacitance coupled in parallel with the energy source for transient current supply.

The signal processor may be a digital signal processor.

The capacitance of the at least one capacitor is preferably greater than 1 mF, more preferred greater than 4 mF, even more preferred greater than 10 mF, most preferred greater than 20 mF.

Preferably, the energy source is a metal-air battery, such as a zinc-air battery.

The at least one capacitor may comprise a fast super capacitor, e.g. an electrochemical double layer capacitor with a highly conductive polymeric, proton conductive electrolyte of the type disclosed in Technical Information, Bestcap a new dimension in "fast" supercapacitors, Scot Tripp, AVX Ltd, Fleet, UK.

Typically, a hearing aid has a housing holding the input and the output transducer and the signal processor and that is adapted to be worn, i.e. behind the ear, in the ear, or in the ear canal, and wherein the output of the output transducer is led to the eardrum in a way that is well-known in the art of hearing aids.

The terminals of the at least one capacitor is preferably connected across the battery terminals of the hearing aid.

In another embodiment, the terminals of the at least one capacitor is connected to the signal processor in such a way that the distance between the terminals and the power supply terminals of the signal processor is substantially minimized.

BRIEF DESCRIPTION OF THE DRAWING

Still other objects of the present invention will become apparent to those skilled in the art from the following description wherein the invention will be explained in greater detail. By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawing.

DETAILED DESCRIPTION OF PREFERRED EMBODIMENTS

Figure 1:
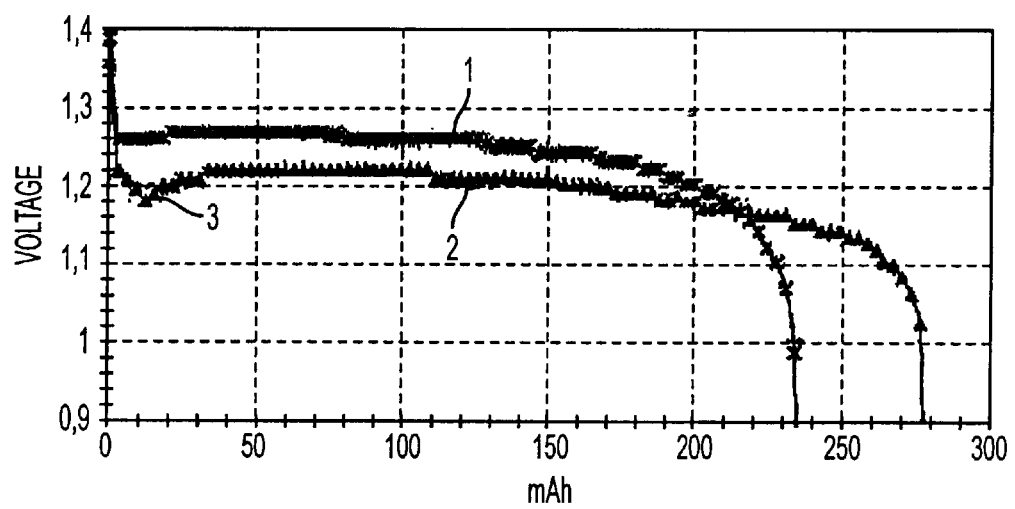
FIG. 1 shows a plot of output voltage as a function of ampere-hours for two batteries loaded by a continuous current.

FIG. 1 shows a plot of output voltage 1, 2 as a function of ampere-hours for two batteries from different battery manufacturers loaded by a continuous current of 3.0 mA. The operating period of the battery is said to expire when the battery output voltage falls below 1.1 volt. It is seen that the battery with the highest output voltage 1 also has the shortest operating period. A short drop 3 in output voltage 2 at the start of operation of the other battery is also noted.

Figure 2:
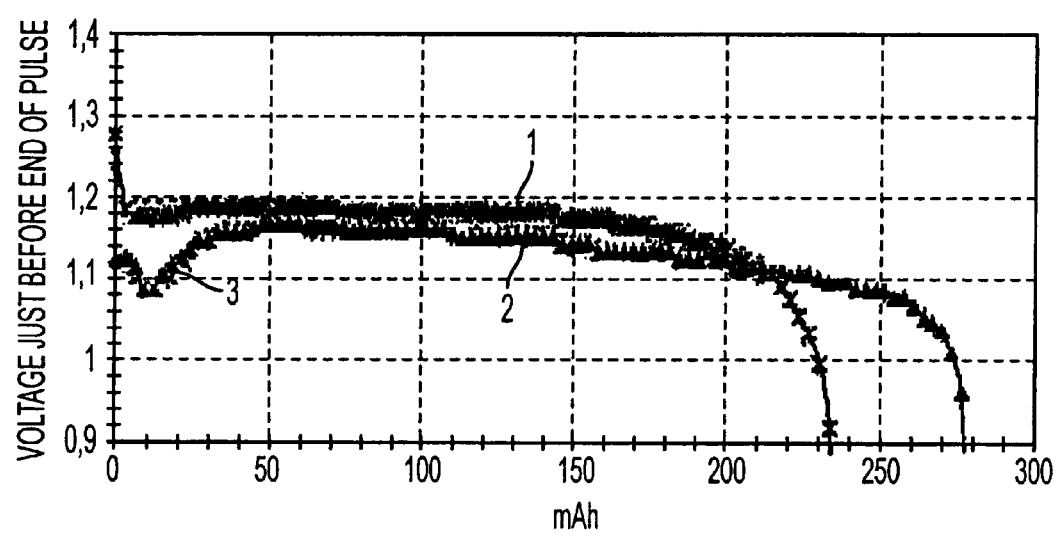
FIG. 2 shows a plot of output voltage as a function of ampere-hours for two batteries loaded by a continuous current with superposed current pulses.

FIG. 2 shows a plot of output voltage 1, 2 as a function of ampere-hours for two batteries from the same battery manufacturers as FIG. 1, however, loaded with a more realistic current consisting of a continuous current of 3.0 mA superposed with 12 mA current pulses with 100 ms duration. The period between pulses is one hour. It is noted that for both batteries, the output voltages 1, 2 have dropped while the operating period of the battery with the highest output voltage 1 remained unchanged and the operating period of the other battery decreased to the same value. It is also noted that the short drop 3 in output voltage 2 at the start of operation of the other battery has become deeper and that the battery output voltage 2 falls below 1.1 volt during the drop 3. Thus, a hearing aid user using this battery under these circumstances would experience an extremely short operating period of 1–2 hours.

Figure 3:
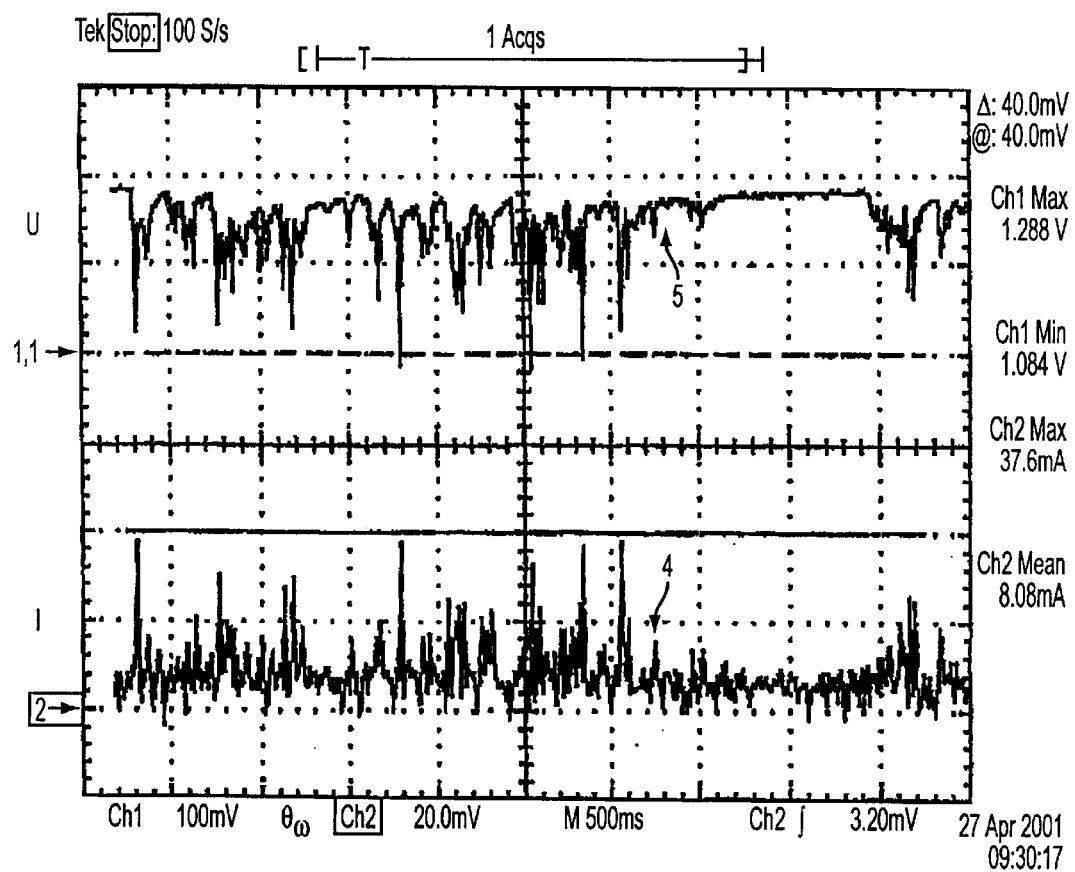
FIG. 3 is a plot of the current drawn by a digital hearing aid amplifying speech and the resulting battery output voltage.

FIG. 3 is a plot of the current 4 drawn by a prior art digital hearing aid amplifying speech and the resulting battery output voltage 5. The speech signal is the artificial speech signal from the ICRA noise CD developed by the International Colloquium of Rehabilitative Audiology. It should be noted that the battery output voltage falls below 1.1 volt whereby the battery alarm is triggered forcing or urging the hearing aid user to replace the battery.

The voltage drops and corresponding lack of ability of the battery to supply the required current pulse also creates distortion of the output signal of the signal processor.

Figure 4:
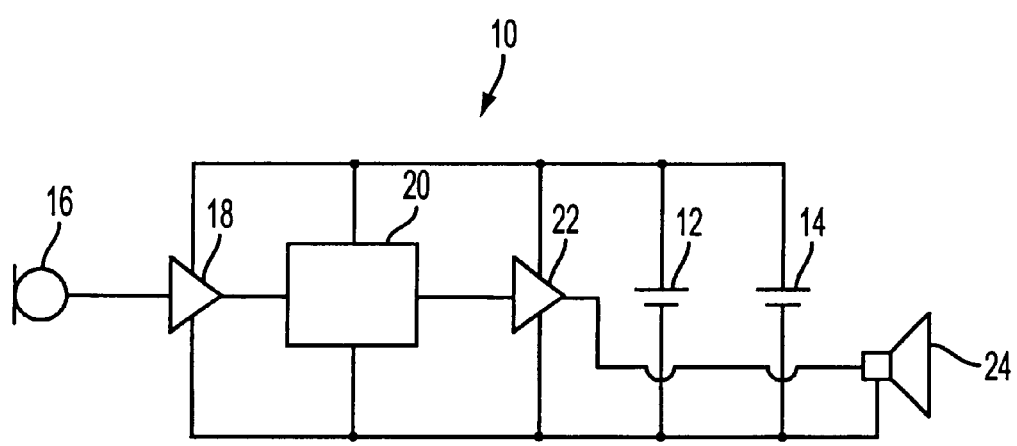
FIG. 4 is a schematic diagram of a hearing aid according to the present invention.

FIG. 4 shows a schematic diagram of a hearing aid 10 with a capacitor 12 connected in parallel with the battery 14 according to the present invention. The hearing aid 10 comprises a microphone 16 constituting the input transducer for reception of sound from the environment and generation of a corresponding electronic signal. The microphone 16 may be of a directional type, e.g. the input transducer may comprise more than one microphone, wherein several input signals are combined into a single signal. The electronic signal is fed to a digital signal processor 18 via an A/D converter 20. If appropriate, the A/D converter 20 may be preceded by a preamplifier (not shown). The digital signal processor 18 processes the signal according to a desired frequency characteristic and compressor function to provide an output signal suitable for compensating the hearing impairment of the user. The output signal is fed to an output transducer 24 through a sigma-delta converter 22. The output transducer 24 converts the output signal to an acoustic output signal. The capacitance of the capacitor 12 is 5 mF.

Figure 5:
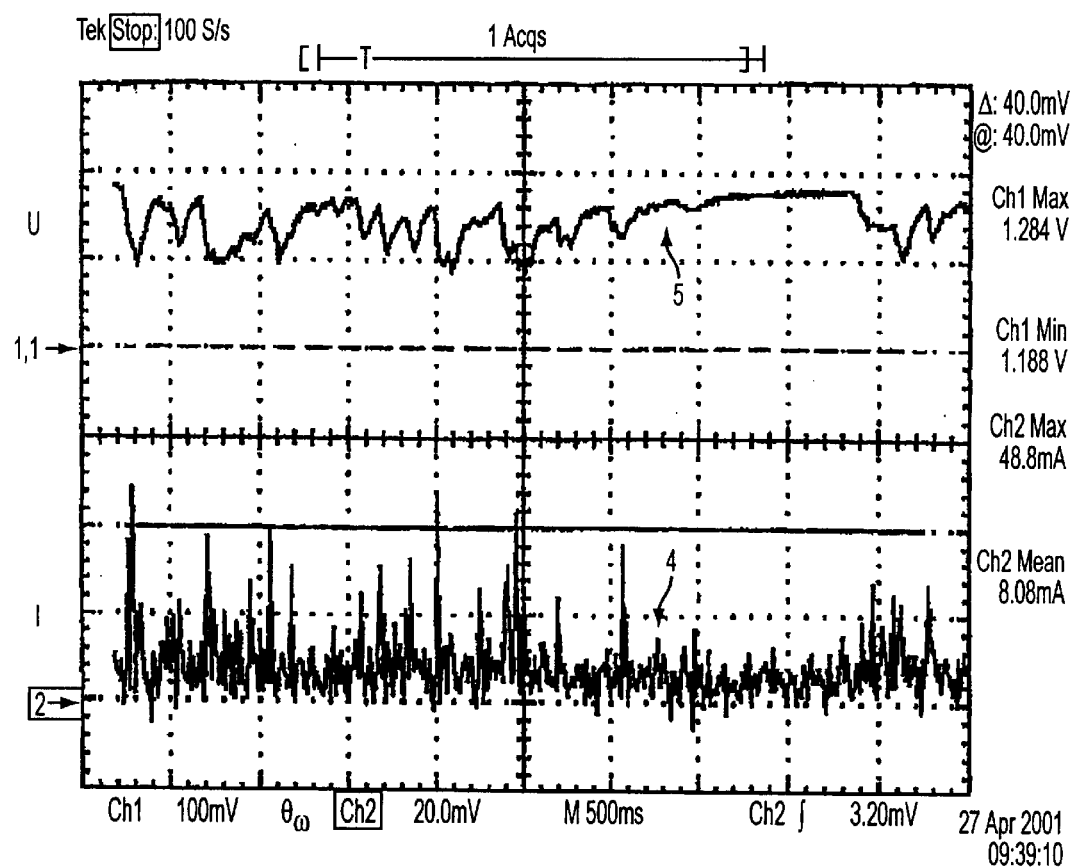
FIG. 5 is a plot of the current drawn by a digital hearing aid according to the present invention amplifying speech and the resulting battery output voltage.

FIG. 5 corresponds to FIG. 3 and is a plot of the current 4 drawn by a digital hearing aid according to the present invention during amplification of ICRA artificial speech, and of the resulting battery output voltage 5. Comparing with FIG. 3, it is seen that the battery output voltage 5 is smoothened and that the voltage no longer drops below 1.1 volt. Thus, with a hearing aid according to the present invention, the operating period of the battery has been prolonged compared to prior art digital hearing aids. Further, the smaller variations in voltage lead to less distortion of the output signal of the signal processor.

Figure 6:
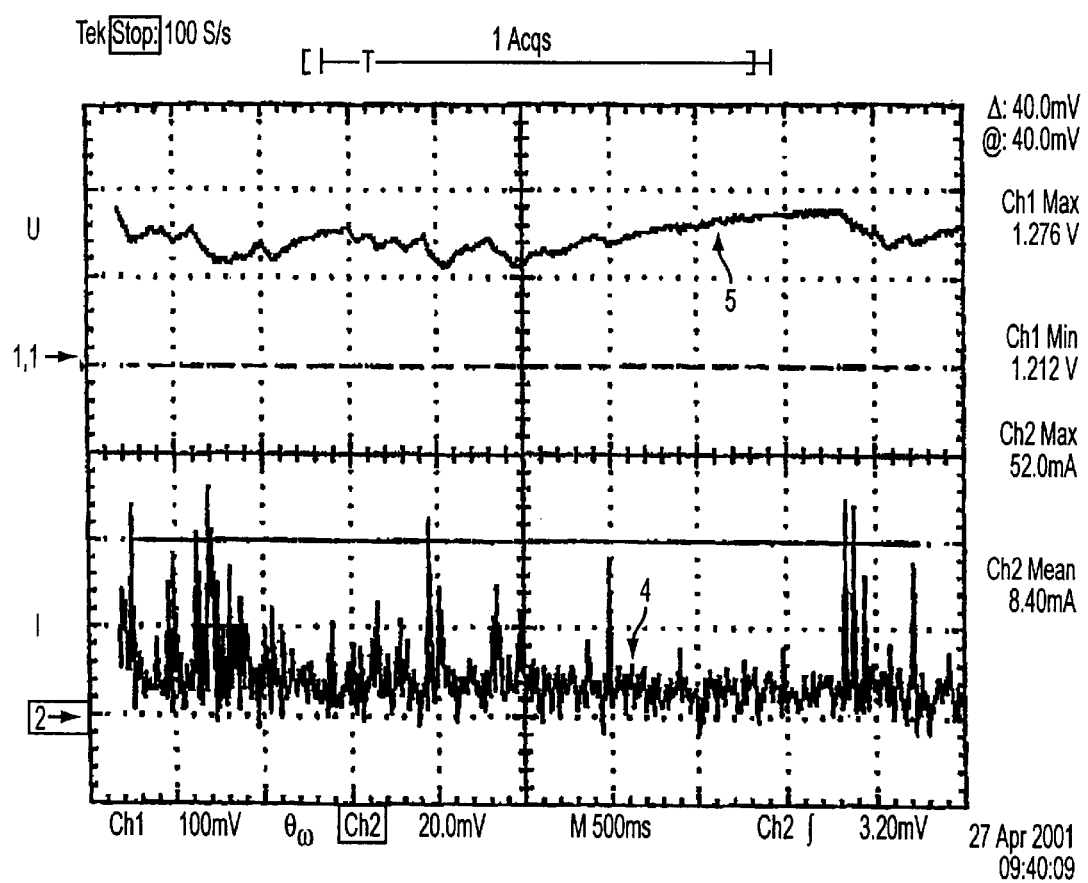
FIG. 6 is a plot of the current drawn by a digital hearing aid according to the present invention amplifying speech and the resulting battery output voltage.

FIG. 6 shows another plot corresponding to the plot shown in FIG. 5, wherein the capacitance is 20 mF. It is seen that voltage 5 variations decrease further.

Figure 7:
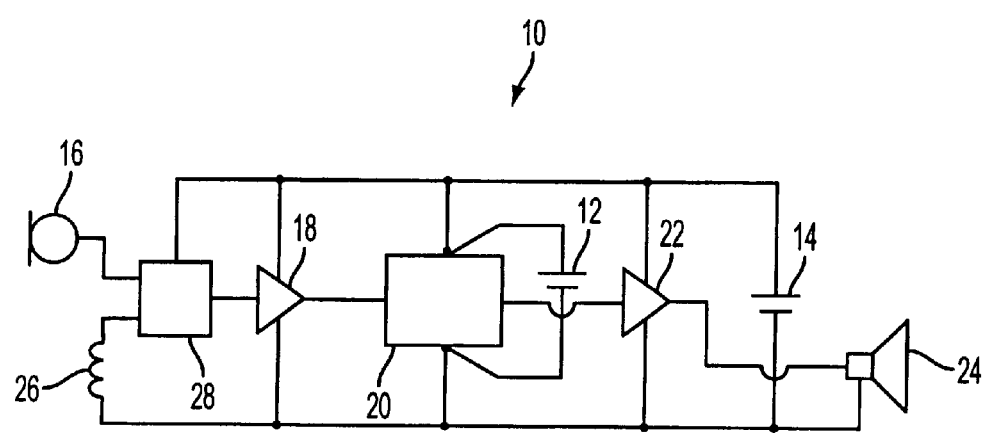
FIG. 7 is a schematic diagram of a hearing aid according to the present invention, comprising a telecoil.

FIG. 7 is a schematic diagram of a hearing aid 10 according to the present invention, comprising a pick-up coil, namely telecoil 26. The microphone 16 and the telecoil 26 are connected to a mixer stage 28 and the output of the mixer stage 28 is connected to the A/D converter 20. In a hearing aid 10 with a telecoil 26, the inclusion of a capacitor 12, such as a supercapacitor 12, for energy supply has a further effect. The currents drawn by the hearing aid circuitry 18, 20, 22 creates a magnetic field in the surroundings. This field is picked up by the telecoil 26 and distorts the telecoil signal. Second harmonic distortion may amount to 30%. In some prior art hearing aids this has been compensated by adding a compensating current path to the power supply current loop so that the generated magnetic field is lowered. However, the compensating current path is designed under the assumption of a specific power supply current loop geometry. The present inventor has shown that this geometry changes with the rotational position of the battery. In a zinc-air battery there is air above the zinc powder. This means that current flowing from the bottom of the battery cannot find a direct linear path to the top of the battery because of this air. In stead, the current has to travel around the air volume.

Figure 8:
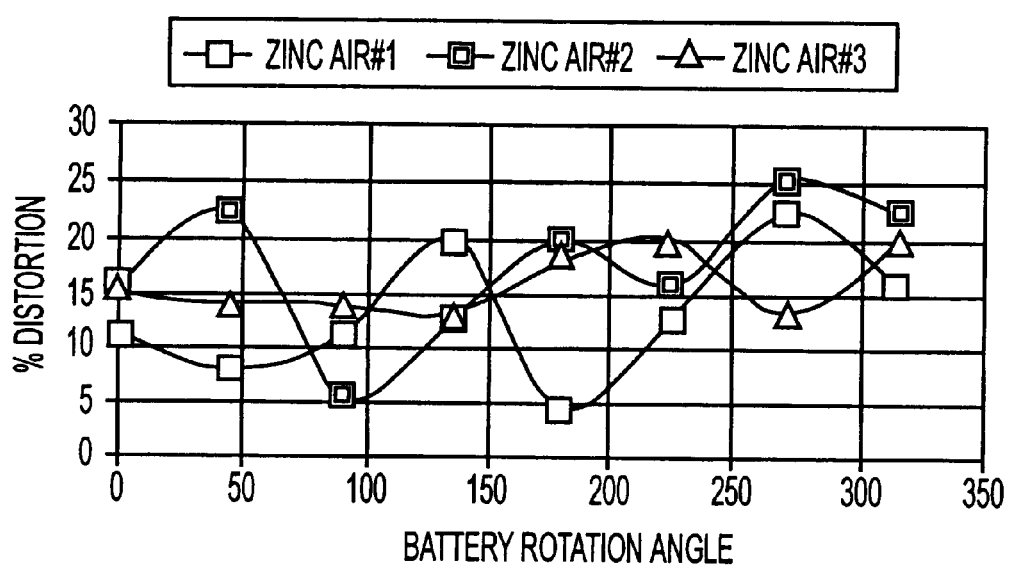
FIG. 8 shows a plot of second harmonic distortion in a telecoil signal as a function of rotational position of three different zinc-air batteries.

FIG. 8 shows a plot of second harmonic distortion in the telecoil signal as a function of rotational position of three different zinc-air batteries. It is seen that the amount of distortion is different for different batteries and so is the minimum obtainable amount of distortion. When a high capacitance capacitor is connected to the circuitry to supply current transients to the circuitry, a well defined current path for the current transients generating the high magnetic fields picked up by the telecoil is established. Then it is possible to design of a compensating current path that is substantially independent of battery type, battery manufacturing process, and of the rotational position of the battery.

Further, in FIG. 7, the connections of the capacitor is drawn to illustrate that the capacitor may be connected to the circuitry in such a way that the area of the current loop through which the transient currents flow is minimized thereby further minimizing the magnetic fields generated by the transient currents.

What is claimed is:

1. A hearing aid comprising a housing, an input transducer for transforming an acoustic input signal into a first electrical signal, a telecoil, a signal processor for generating a second electrical signal based on the first electrical signal, an output transducer for conversion of the second signal into sound, an energy source for supplying energy to the signal processor, and at least one fast super capacitor of large capacitance for transient current supply, coupled in parallel with the energy source and arranged in such a way that the distances between the capacitor terminals and the power supply terminals of the signal processor are substantially minimized and further such that the energy source does not supply transient currents.

2. The hearing aid according to claim 1, comprising a compensation current path.

3. A hearing aid comprising:
   a housing,
   an input transducer for transforming an acoustic input signal into a first electrical signal,
   a signal processor for generating a second electrical signal based on the first electrical signal,
   an output transducer for conversion of the second electrical signal into sound,
   an energy source for supplying energy to the signal processor, and
   at least one fast super capacitor of large capacitance coupled in parallel with the energy source,
   the fast super capacitor being positioned such that distances between terminals of the fast super capacitor and power supply terminals of the signal processor are substantially minimized;

the fast super capacitor being positioned to supply transient currents drawn by the signal processor; and the fast super capacitor being positioned to ensure that the energy source does not supply said transient currents.

4. A hearing aid according to claim 3, wherein said signal processor is a digital signal processor.

5. A hearing aid according to claim 3, wherein said energy source is a metal-air battery.

6. A hearing aid according to claim 3, wherein said energy source is a zinc-air battery.

7. A hearing aid according to claim 3, further comprising a telecoil.

8. A hearing aid according to claim 3, wherein the capacitance of said at least one capacitor is greater than 1 mF.

9. A hearing aid according to claim 3, wherein the capacitance of said at least one capacitor is greater than 4 mF.

10. A hearing aid according to claim 3, wherein the capacitance of said at least one capacitor is greater than 10 mF.

11. A hearing aid according to claim 3, wherein the capacitance of said at least one capacitor is greater than 20 mF.

12. A hearing aid according to claim 3, wherein said at least one capacitor is an electrochemical double layer capacitor with a highly conductive polymeric, proton conductive electrolyte.

* * * * *

UNITED STATES PATENT AND TRADEMARK OFFICE
CERTIFICATE OF CORRECTION

PATENT NO. : 6,829,364 B2
DATED : December 7, 2004
INVENTOR(S) : Henning Haugaard Andersen and Ole Erik Toft It is certified that error appears in the above-identified patent and that said Letters Patent is hereby corrected as shown below:

<u>Title page,</u>
Item [73], Assignee, delete "Topholm & Westermann APS NY" and insert
-- Widex A/S --

Signed and Sealed this

Twenty-first Day of June, 2005

JON W. DUDAS
*Director of the United States Patent and Trademark Office*